UNITED STATES PATENT OFFICE.

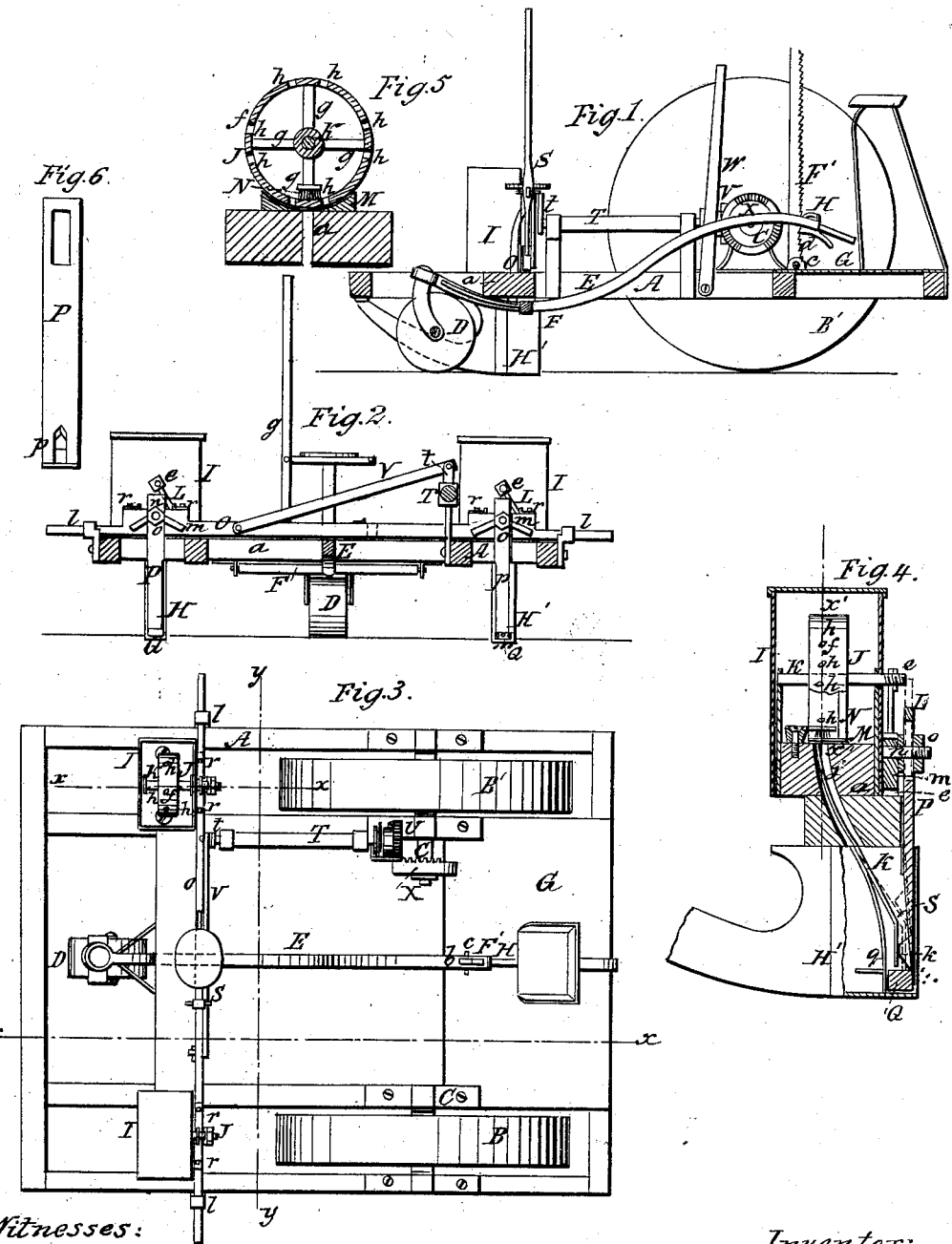

R. R. FENNER, OF PAXTON, ILLINOIS, ASSIGNOR TO HIMSELF AND W. H. PATTON, OF SAME PLACE.

IMPROVEMENT IN CORN-PLANTERS.

Specification forming part of Letters Patent No. 38,627, dated May 19, 1863.

*To all whom it may concern:*

Be it known that I, R. R. FENNER, of Paxton, in the county of Ford and State of Illinois, have invented a new and Improved Seeding-Machine; and I do hereby declare that the following is a full, clear, and exact description of the same, reference being had to the accompanying drawings, making a part of this specification, in which—

Figure 1 is side sectional view of my invention, taken in the line $x\ x$, Fig. 3; Fig. 2, a transverse vertical section of the same, taken in the line $y\ y$, Fig. 3; Fig. 3, a plan or top view of the same; Fig. 4, a vertical section of a portion of the same, taken in the line $z\ z$, Fig. 3; Fig. 5, a vertical section of Fig. 4, taken in the line $x'\ x'$; Fig. 6, a detached view of a vertical slide-bar pertaining to the invention.

Similar letters of reference indicate corresponding parts in the several figures.

This invention relates to an improved seed-planting device of that class which are designed for planting seed either in hills or drills.

To enable those skilled in the art to fully understand and construct my invention, I will proceed to describe it.

A represents the frame of the machine, which is of rectangular form and mounted on two wheels, B B', which are placed on separate axles C C. The front part of this frame A is supported by a caster-wheel, D, which is connected to the front part of a bent or curved arm, E, the latter being attached at right angles to a shaft, F, which is fitted in proper bearings underneath a cross-beam, $a$, of the frame A. (See Fig. 2.) The back part of the arm E has a slot, $b$, made in it, through which rack-bar, F', passes, the lower end of the latter being attached by a joint or pivot, $c$, to a cross-plate, G, on the frame A. (See Fig. 1.) In the slot $b$ of the arm E there is fitted a pawl, H, which is constructed of a short metal bar bent in the form of a hook, so that it may catch and work over the outer edge of the slot $b$, said hook having a projecting lip, $d$, which catches into the rock-bar F' and retains the arm E at any desired point. By this arrangement the arm E may be adjusted at its outer end higher or lower, and the furrow-shares H', which are at the front part of the frame A, raised or lowered and retained at such a point as to make furrows of the required depth.

On the front part of the frame A, at each end of the cross-beam $a$, there is placed a hopper or seed-box, I, and in these hoppers there are placed wheels J J, one in each. These wheels are fitted on shafts K K, the back ends of which pass through the backs of the hoppers, and have squares formed on them to receive arms L, which are secured in proper position by nuts $e$. (See more particularly Figs. 2 and 4.) The wheels J J are constructed with flat broad bands or peripheries $f$, connected to the shafts K by radial arms $g$, and the peripheries are perforated with holes $h$ of different diameters, said holes being arranged in pairs, the holes of each pair being of equal diameter. (See Fig. 5.) The peripheries $f$ of the wheels work in concave blocks M, which are attached to the bottoms of the hoppers, said blocks having each a hole, $i$, made vertically and centrally through them, and these holes register or coincide with vertical openings or passages $k$, made in the back parts of the furrow-shares H'. (See Fig. 4.)

In each hopper I there is a cut-off brush, N, which bears upon the inner side of the lower part of the peripheries $f$ of the wheels J. (See Fig. 5.) O is a slide-bar, which is directly back of the hoppers I I, and works in suitable guides, $l$, attached to the frame A. This slide-bar has a double-inclined slot, $m$, made in it near each end, as shown in Fig. 2, and in each of these slots a pin, $n$, is fitted. These pins $n$ are attached to vertical slides P, which are fitted in the back parts of the furrow-shares H', the pins being secured to the slides by nuts O. To the inner sides of the slides D, near their lower ends, there are attached beveled projections $p$, and in the lower part of each furrow-share there is placed a slide, Q, the back ends of which bear against a spring, $q$. (See Fig. 5.) The springs $q$ have a tendency to keep the slides Q shoved forward to fill the space below the slides P when the latter are at their most elevated point. (See Fig. 4.)

To the upper surface of the slide-bar O, and directly over the slots $m$ therein, there are secured adjustable stops $r\ r$. (See Figs. 2 and 3.) These stops $r\ r$, as the slide-bar O is operated, actuate the arms L and turn the wheels J first in one direction and then in the other, and cause the seed to be discharged from the hoppers I. The seed, it will be seen, fill the holes $h$ in the lower part of the peripheries $f$ of the wheels J, and said holes are, by the turning of the wheels, brought in line with the hole $i$ in the blocks M underneath the brushes N, the two holes $h$ of a pair being alternately moved in this way. The holes of the several pairs in a wheel are of different sizes to admit of the discharge of a greater or less amount of seed at each dropping, or to suit seed of different sizes, and by shifting the wheels J either pair of holes may be brought in working position. In shifting the wheels J the arms L are removed from the shafts K and attached, when the wheels are adjusted, in the proper position to be actuated by the stops $r$ $r$, which, by being adjustable, may be regulated to give the desired throw or movement to the wheels J, as may be desired. The slides P are raised and lowered by the double-inclined slots $m$. When they are raised the seed drops down through the holes $i$ $j$ and into the openings or passages $k$, and upon the slides Q, and when the slides P descend the projections $p$ force back the slides Q underneath partitions $s$, which form the backs of the passages $k$, and as said slides Q are forced back the seed drops down in front of the slides Q and is forced out from the passages by said slides as the slides P rise, the springs $q$ forcing the slide Q forward. By this means the seed is ejected from the furrow-shares with certainty. There can be no choking or clogging of the passages $k$ to prevent the discharge of the seed.

The slide-bar O may be worked by hand through the medium of a lever, S; or it may be worked by a crank, $t$, from a shaft, T, which has a sliding pinion, U, upon it. This pinion U is operated by a lever, W, so that it may be thrown in or out of gear with a part pinion, X, on the axle of the wheel B'. The part pinion X gives an intermittent rotary motion to the shaft T, so as to cause a dwell or cessation of movement of the slide-bar O at the termination of each stroke of the same. The crank $t$ of the shaft T is connected to the slide-bar O by a pitman, Y.

I would remark that the part pinion X may be toothed at both sides, and arranged so as to be capable of being reversed on its shaft to vary the speed or intervals of movement of the slide-bar O, as may be required, the teeth being differently arranged at opposite sides of the pinion, so as to effect the above result.

Having thus described my invention, what I claim as new, and desire to secure by Letters Patent, is—

1. Operating the seed-discharging wheels J by means of the arms L, attached to the shafts K of the wheels, the adjustable stops $r$ $r$, and slide-bar O, as set forth.

2. The part pinion X, sliding pinion U on shaft T, the crank $t$, and pitman Y, when all are arranged specifically as shown, for operating the slide-bar O.

R. R. FENNER.

Witnesses:
JOHN P. DAY,
JOHN BODLEY.